July 8, 1930.    M. D. JEFFRIES    1,770,158
CARTON FILLER
Filed March 29, 1929    2 Sheets-Sheet 1
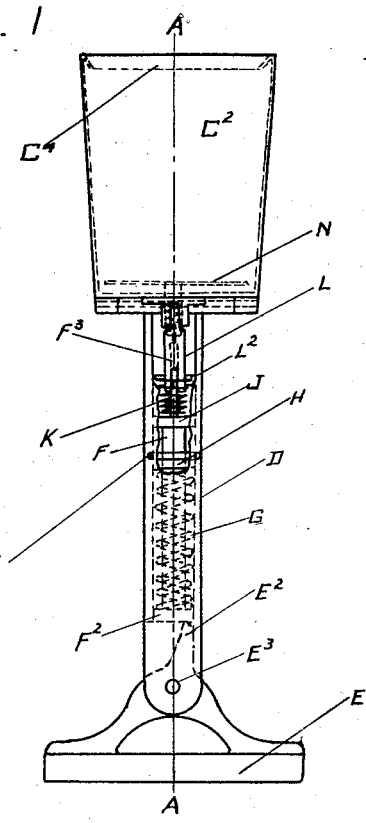
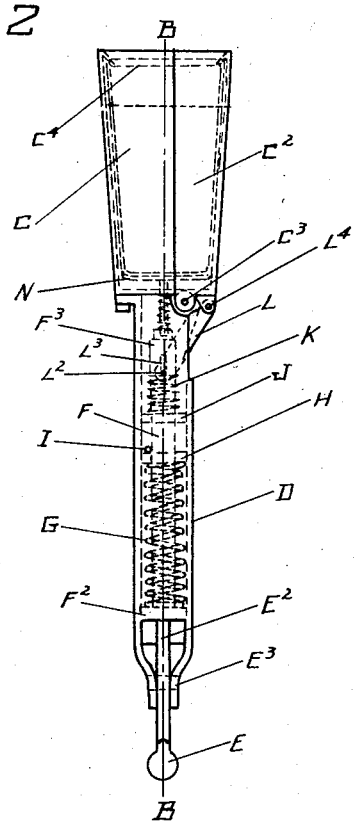
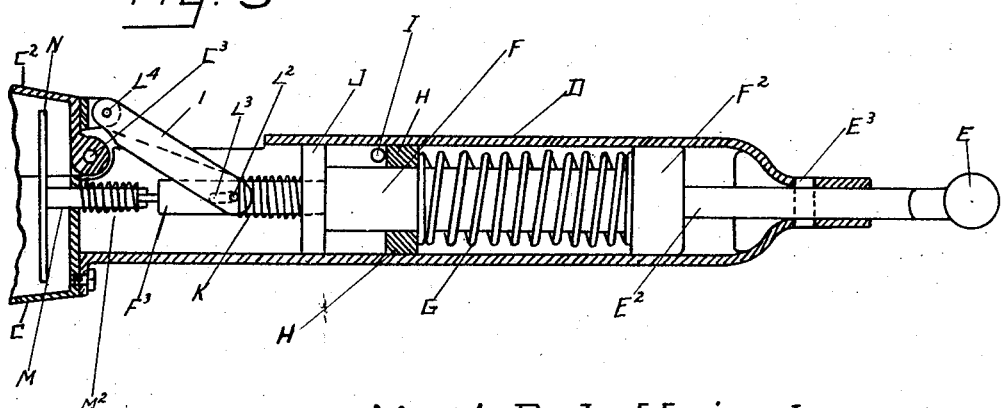
Mack D. Jeffries Inventor
Attorney July 8, 1930.   M. D. JEFFRIES   1,770,158
CARTON FILLER
Filed March 29, 1929   2 Sheets-Sheet 2
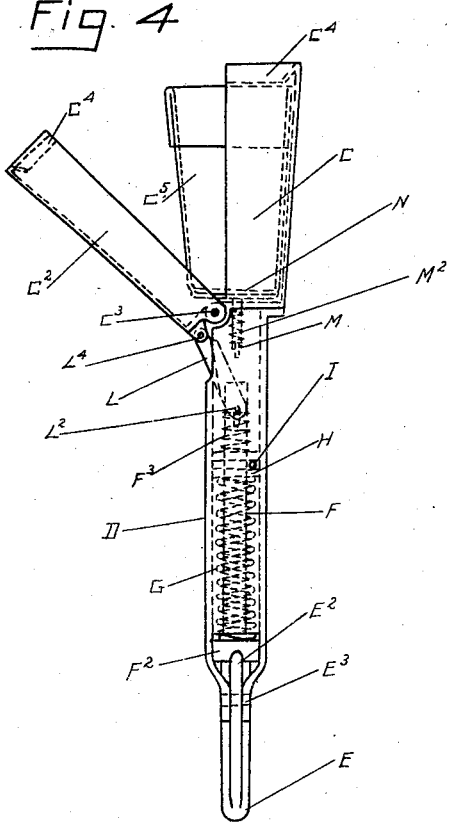
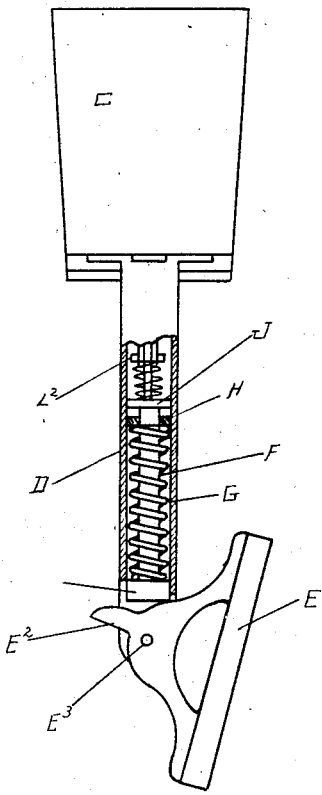
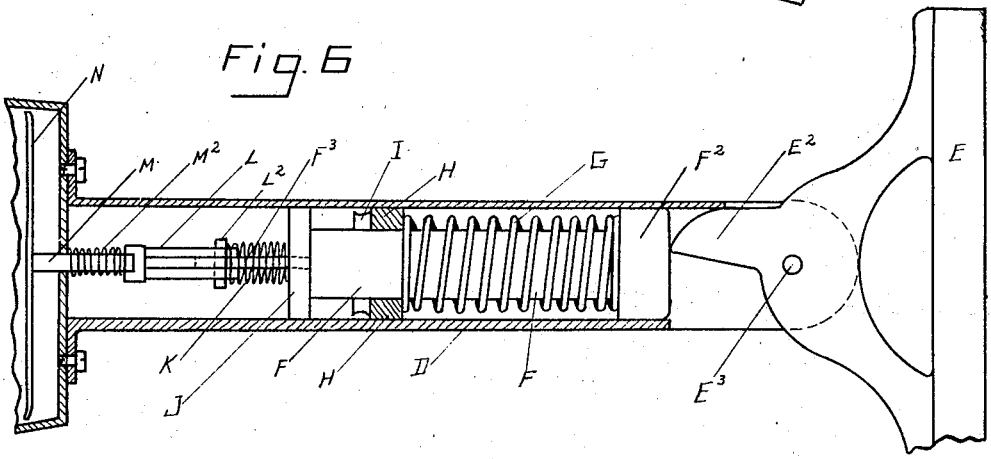
Mack D. Jeffries Inventor
By Clarence W. Lovett
Attorney Patented July 8, 1930

1,770,158

UNITED STATES PATENT OFFICE

MACK D. JEFFRIES, OF BOSTON, MASSACHUSETTS, ASSIGNOR, BY MESNE ASSIGNMENTS, OF ONE-HALF TO EMELIE F. SINGER, OF NEWTON HIGHLANDS, MASSACHUSETTS

CARTON FILLER

Application filed March 29, 1929. Serial No. 351,054.

My invention relates to holders for containers or boxes such as are commonly used for dispensing ice cream at soda fountains and at retail, and for holding such boxes while they are being filled.

It has for its objects to provide a more sanitary method of filling than heretofore available; to minimize the expense of handling; to conserve time; to make possible the use of low cost containers; to provide an accurate and uniform measure; to provide an effective cutting edge; to provide means for adjusting and fixing the container under and against the cutting edge; to provide an effective locking means; to provide means adaptable to function first in closing the holding member, second in adjusting the container under and against the cutting edge, and third in locking the container and holding member in closed position for use in filling, all in the order named this sequence being important for perfection in operation; and to provide the various other advantages and results made evident from the following specification.

I accomplish the objects of my invention by providing a box shape and box holding member, adaptable to open for the purpose of receiving a box or container, and to close on, over, and about said box, said holding member having attached thereto a convenient handle for the purpose of inserting the box and holding member, open end first, into the substance with which the box is to be filled, and operating means designed to control the opening movement, to adjust and fix the container under and against the cutting edge, to control the closing of said holder, and to control the locking of said container and holding member in closed position.

Referring to the accompanying drawings which form a part of this specification, Figure 1 shows a front view of my device. Figure 2 shows a side view. Figure 3 is an enlarged cross sectional view of the handle on the line A—A in Figure 1. Figure 4 is a view of my device in open position from the side opposite that shown in Figure 2. Figure 5 is a side view of my device opposite that shown in Figure 1. Figure 6 is an enlarged cross sectional view of the handle on the line B—B in Figure 2.

Referring again to the drawings, C shows the fixed side of the container or box holder. $C^2$ shows the opening side of the holder. $C^3$ shows the hinge on which the opening side $C^2$ swings and operates. D shows the shank extending from the handle E to the holder C. F shows a shaft slidably mounted within the shank D. $F^2$ shows an enlarged shoulder at the end of the shaft F, designed to engage with the spring G so that as the pressure of the spring G is exerted the shaft F is constantly forced in the direction of the handle E. H shows a washer on the shaft F. I shows a pin positioned in the shank D, forming a rest for the washer H, and causing the pressure of the spring G to be exerted in the direction of the handle E. $F^3$ shows an extension of the shaft F reduced in size. J shows a washer fitted on the extension $F^3$. K shows a spring mounted about the shaft extension $F^3$, and exerting its pressure against the connecting rod L one end of which is slidably mounted on the extension shaft $F^3$ by the pin $L^2$ in the slot $L^3$, and its opposite end hinged at $L^4$ to the opening side $C^2$. The pressure of the spring K at all times positions the pin L at the end of the slot $L^3$ nearest the holder C, except that when the spring G is compressed by action of the handle E the pin $L^2$ slides to the opposite end of the slot $L^3$. During this movement the extension shaft $F^3$ moves forward to contact with and press the shaft M. This in turn forces the plate N in the direction away from the handle E and positions the edges of the container or box $C^5$ under and against the cutting edge $C^4$. The shaft F is forced in the direction of the holder, which movement closes the side $C^2$, by action of the leverage arm $E^2$, operated from the position shown in Figure 5 to the position shown in Figure 6. In effecting this movement the handle E turns on the pin $E^3$ upon which it is mounted. A locking of the shaft F, with the spring G in compressed position as shown in Figure 6, is secured by the leverage arm $E^2$ being off center as shown in Figure 6. As the handle E is returned to the position shown in Figure 5, the shaft F positions as also shown in Figure 5 and the spring M² forces the shaft M and the plate N away from the cutting edge C⁴ to receive another container or box C⁵.

The device functions in the following manner: first turning the handle E to the position shown in Figure 5 which opens the side C² as shown in Figure 4. Insert the box C⁵ as shown in Figure 4. Turn the handle E to the position shown in Figure 1 which in turn closes the side C² and forces the container C⁵ under and against the cutting edge C⁴ by action of the plate N. In this position the device is forced open end first into the ice cream or other substance it is desired to dispense. A firm downward pressure fills the box. A slight twist breaks the contents from the source of supply, the device is withdrawn, the handle E turned to the position shown in Figure 5, the side C² opens as shown in Figure 4 and the filled box C⁵ is ready for dispensing. The operation described is accomplished in short order and may be repeated as often as required.

Similar letters of reference refer to similar parts throughout the various views.

While I have illustrated and described a preferred construction for carrying my invention into effect, this is capable of variation or modification without departing from the spirit of the invention. I therefore do not wish to be limited to the exact details of construction herein set forth but desire to avail myself of such variations and modifications as come within the scope of the appended claims.

Having thus described my invention I claim as new and desire to secure by Letters Patent of the United States of America.

1. A device of the character described comprising a carton holding receptacle adapted to be forced into plastic material to effect filling of a carton held by the device, said receptacle being composed of a pair of sections, one of which is pivoted for opening and closing movement relative to the other, a hollow handle rigid with the latter section, and a slidable member within said handle operatively connected with said pivoted receptacle section whereby movement of said member in opposite directions opens and closes said pivoted receptacle section, respectively.

2. A device of the character described comprising a carton holding receptacle adapted to be forced into plastic material to effect the filling of a carton held by the device, said receptacle being composed of a pair of sections connected together for opening and closing movement, each section having a cutting edge and a carton retaining lip adjacent thereto, a follower within said receptacle, and means whereby closing of said receptacle sections actuates said follower to force a carton disposed within said receptacle in a direction to cause engagement of the outer edge of the carton with said retaining lip.

3. A device of the character described comprising a carton holding receptacle adapted to be forced into plastic material to effect filling of a carton held by the device, said receptacle being composed of a pair of sections connected together for opening and closing movement, each section having a cutting edge and carton edge protecting means adjacent thereto, a hollow handle rigid with one of said sections, an actuating member slidable within said handle, a link pivoted to the other of said sections and having a lost motion connection with said actuating member to permit continued movement of said actuating member in a receptacle section closing direction after the receptacle sections have been closed, and a follower within the receptacle disposed normally at the inner end of the receptacle and operatively connected with said actuating member for movement by the latter in the direction of the outer end of the receptacle after the receptacle sections are closed to cause engagement of the carton edges with said carton edge protecting means.

4. A device of the character described comprising a carton holding receptacle adapted to be forced into plastic material to effect filling of a carton held by the device, said receptacle being composed of a pair of sections connected together for opening and closing movement, each section having a cutting edge and carton edge protecting means adjacent thereto, a hollow handle rigid with one of said sections, an actuating member slidable within said handle, said actuating member being provided with a slot and a shoulder, a pin slidable in said slot, a link pivoted to the other of said sections and to said pin, a coil spring disposed between said pin and said shoulder, and a follower within said receptacle at the inner end thereof inclusive of a stem disposed in operative relation to the adjacent end of said actuating member, whereby continued movement of said actuating member in a direction to effect closing of the receptacle sections is effective after said receptacle sections are closed to move said follower towards the outer end of the receptacle, thereby to cause engagement of the carton edge with said carton edge protecting means.

In testimony whereof I affix my signature.

MACK D. JEFFRIES.